(12) United States Patent
Su

(10) Patent No.: US 10,408,961 B2
(45) Date of Patent: Sep. 10, 2019

(54) SENSING CIRCUIT FOR METAL OBJECT AND METHOD OF SENSING METAL OBJECT

(71) Applicant: Getac Technology Corporation, Hsinchu County (TW)

(72) Inventor: Huang-Wen Su, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 145 days.

(21) Appl. No.: 15/782,211

(22) Filed: Oct. 12, 2017

(65) Prior Publication Data

US 2019/0113646 A1   Apr. 18, 2019

(51) Int. Cl.
*G01V 3/10* (2006.01)

(52) U.S. Cl.
CPC .................................. *G01V 3/101* (2013.01)

(58) Field of Classification Search
CPC ....................................................... G01V 3/101

USPC ... 324/637–661, 500, 515–530, 750.06, 559, 324/600, 76.11, 76.26, 444, 447, 326, 324/200, 207.21, 207.22

See application file for complete search history.

(56) References Cited

U.S. PATENT DOCUMENTS

| | | | | |
|---|---|---|---|---|
| 6,107,924 A | * | 8/2000 | Kasai | ................... H03K 17/954 |
| | | | | 324/204 |
| 2016/0069629 A1 | * | 3/2016 | Seckman | ................ F41A 19/01 |
| | | | | 42/1.02 |

* cited by examiner

*Primary Examiner* — Melissa J Koval
*Assistant Examiner* — Trung Nguyen
(74) *Attorney, Agent, or Firm* — Locke Lord LLP; Tim Tingkang Xia, Esq.

(57) ABSTRACT

A sensing circuit for metal object includes a resonating element, a power supply circuit, and a determining circuit. The resonant element is coupled to the power supply circuit and the determining circuit. The power supply circuit drives the resonating element to generate an oscillation, and the determining circuit determines the position of the metal object relative to the resonating element according to the energy change of the resonating element.

16 Claims, 9 Drawing Sheets

SENSING CIRCUIT FOR METAL OBJECT AND METHOD OF SENSING METAL OBJECT

BACKGROUND OF THE INVENTION

Field of the Invention

The present invention relates to sensing circuits and methods for use with sensing circuits and, more particularly, to a sensing circuit for a metal object and a method of sensing a metal object.

Description of the Prior Art

Police officers on duty carry pistols, handcuffs, batons, knives, and the like for the purposes of self-defense and policing. However, disputes over police brutality are on the rise in recent years. Hence, objective evidence is required to clarify doubts and resolve the disputes.

With the advancement of video technology, police officers on duty are equipped with forensic devices for use in recording the police officers' work and giving evidence to support their cases. In-car videos and body-worn cameras are common forensic devices. Nonetheless, in the face of criminals targeting civilians menacingly, police officers fail to promptly, or even forget, to turn on the forensic devices and/or report to a command center, because the police officers have to single-mindedly fight against the criminal and/or protect the civilians.

SUMMARY OF THE INVENTION

In view of the aforesaid drawbacks of the prior art, it is an objective of the present invention to provide a sensing circuit for a metal object and a method of sensing the metal object so as to detect for the point in time when the metal object leaves a target position and thereby trigger another device to act accordingly. For instance, in an embodiment, with the metal object being a pistol, the sensing circuit detects the point in time when the pistol leaves a holster and thereby enables a forensic device or reports to a command center.

In an embodiment, a sensing circuit for a metal object comprises a resonating element, a power supply circuit and a determining circuit. The resonating element is coupled to the power supply circuit and the determining circuit. The power supply circuit drives the resonating element to generate an oscillation. The determining circuit determines a position of the metal object relative to the resonating element according to an energy change of the resonating element.

In an embodiment, a method of sensing a metal object comprises the steps of: driving a resonating element to generate an oscillation; and determining a position of a metal object relative to the resonating element according to an energy change of the resonating element during a time period of generation of the oscillation.

DETAILED DESCRIPTION OF THE EMBODIMENTS

Figure 1:
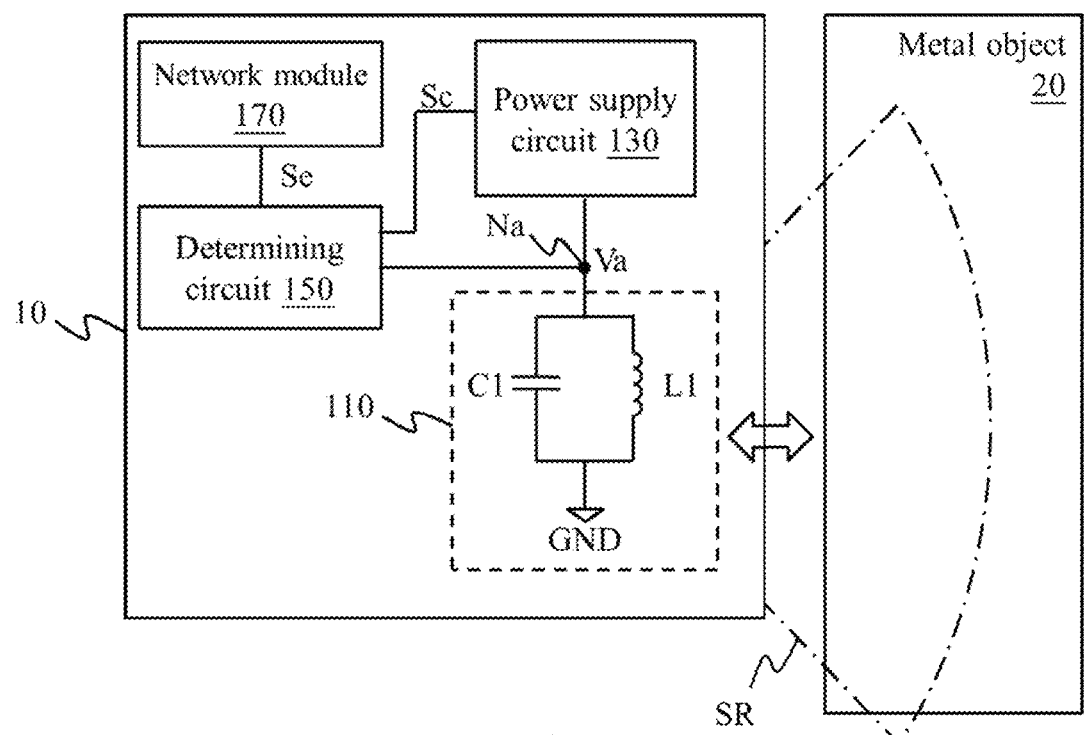
FIG. 1 is a schematic view of a sensing circuit for a metal object according to an embodiment of the present invention.

FIG. 1 is a schematic view of a sensing circuit for a metal object according to an embodiment of the present invention. Referring to FIG. 1, a sensing circuit 10 for a metal object (hereinafter referred to as the sensing circuit 10) comprises a resonating element 110, a power supply circuit 130 and a determining circuit 150. The resonating element 110 is coupled to the power supply circuit 130 and the determining circuit 150. The resonating element 110, the power supply circuit 130 and the determining circuit 150 are jointly coupled to node Na.

Figure 2:
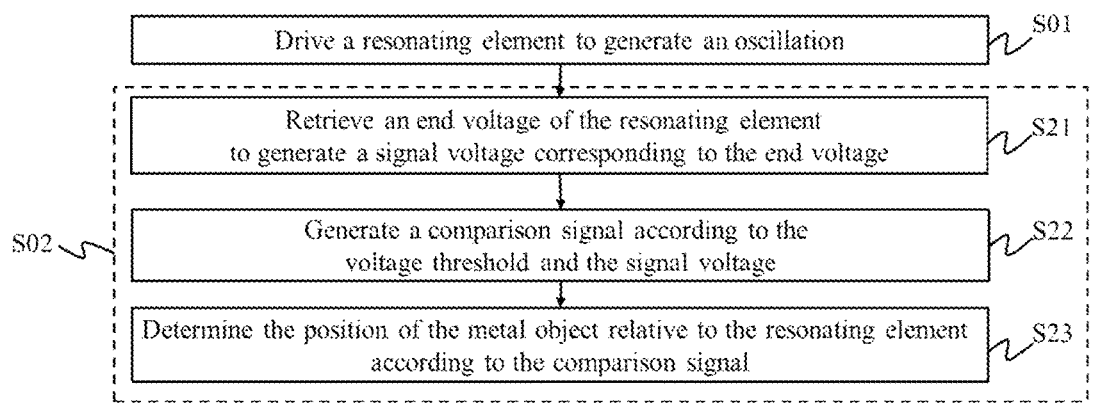
FIG. 2 is a schematic view of the process flow of a method of sensing a metal object according to an embodiment of the present invention.
Figure 3:
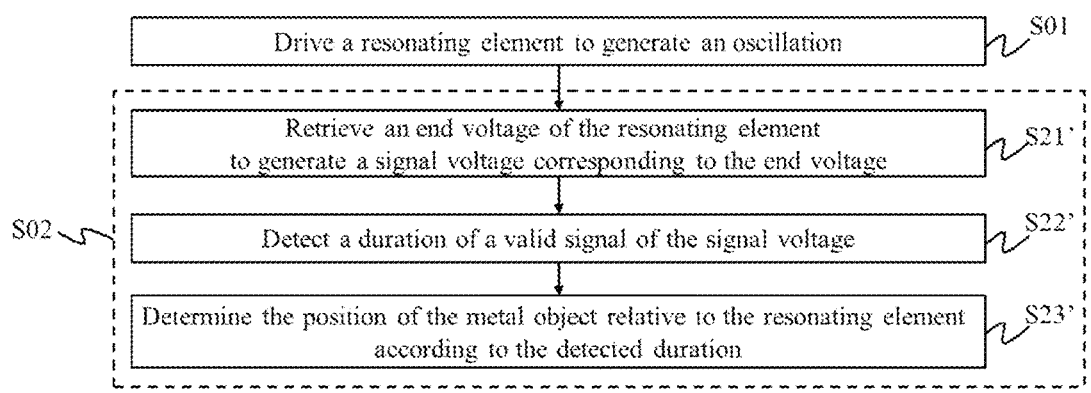
FIG. 3 is a schematic view of the process flow of the method according to another embodiment of the present invention.

FIG. 2 is a schematic view of the process flow of a method of sensing a metal object according to an embodiment of the present invention. FIG. 3 is a schematic view of the process flow of the method according to another embodiment of the present invention. Referring to FIG. 1, FIG. 2, and FIG. 3, the power supply circuit 130 drives the resonating element 110 to generate an oscillation (step S01). During a time period of generation of the oscillation by the resonating element 110, the resonating element 110 senses for a metal object 20 within a sensing reach SR of the resonating element 110 and undergoes a related energy change. During a time period of generation of the oscillation by the resonating element 110, the determining circuit 150 determines the position of the metal object 20 relative to the resonating element 110 according to the energy change of the resonating element 110, thereby determining whether the metal object 20 is present within the sensing reach SR (step S02). The metal object 20 is entirely made of metal. Alternatively, the metal object 20 is not entirely made of metal but has a metal component or is plated with metal.

In an embodiment, the resonating element 110 is a high-Q low-impedance oscillation circuit. In this regard, Q is a ratio of energy stored in the resonating element 110 to energy consumed during a cycle. The resonating element 110 is an LC circuit.

In an embodiment, the resonating element 110 comprises an inductor L1 and a capacitor C1. The inductor L1 and the capacitor C1 are parallel-connected between node Na and a ground GND. Therefore, a first end of the inductor L1 and a first end of the capacitor C1 are coupled together and coupled to the power supply circuit 130 and the determining circuit 150. A second end of the inductor L1 and a second end of the capacitor C1 are coupled together and coupled to the ground GND.

Figure 4:
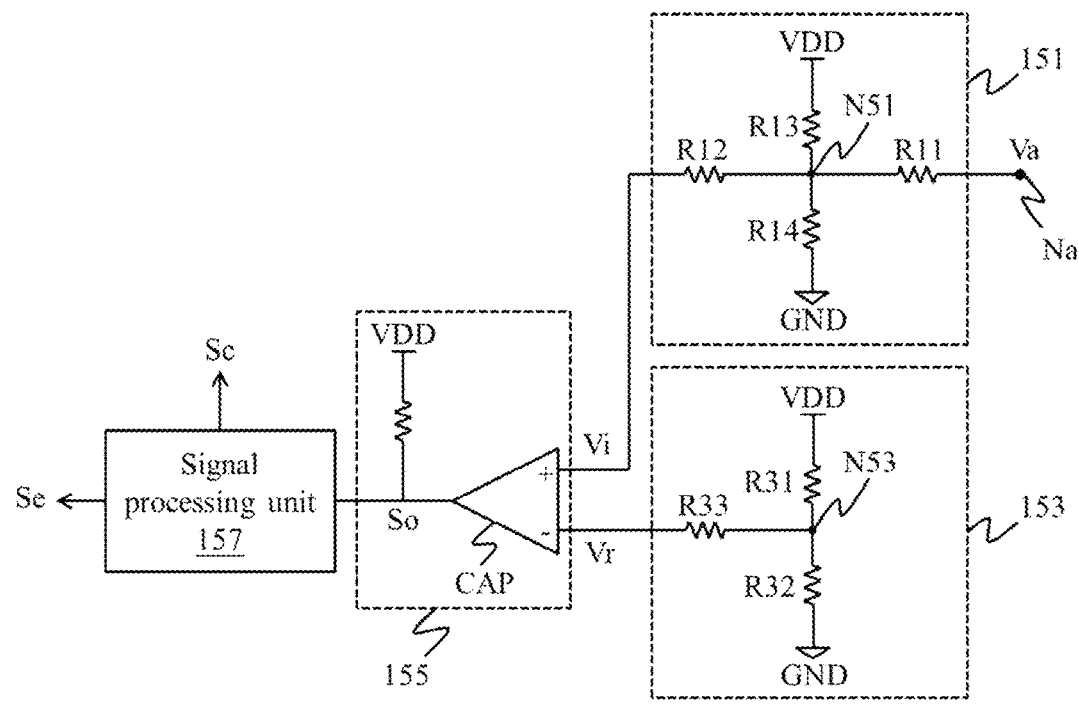
FIG. 4 is a schematic view of a determining circuit of FIG. 1 according to an embodiment of the present invention.

FIG. 4 is a schematic view of the determining circuit 150 of FIG. 1 according to an embodiment of the present invention. Referring to FIGS. 1 and 4, in an embodiment, the determining circuit 150 comprises a voltage retrieving unit 151, a threshold generating unit 153, a comparator circuit 155 and a signal processing unit 157. The voltage retrieving unit 151 is coupled between the resonating element 110 and a first input end of the comparator circuit 155. The threshold generating unit 153 is coupled to a second input end of the comparator circuit 155. An output end of the comparator circuit 155 is coupled to the signal processing unit 157.

Referring to FIGS. 1, 2 and 4, the voltage retrieving unit 151 retrieves an end voltage Va (i.e., voltage at node Na) of the resonating element 110 and generates a signal voltage Vi (step S21) corresponding to the end voltage Va. The threshold generating unit 153 generates a voltage threshold Vr of a predetermined level in accordance with a supply voltage VDD. The comparator circuit 155 generates a comparison signal So according to the voltage threshold Vr and the signal voltage Vi (step S22). The signal processing unit 157 determines the position of the metal object 20 relative to the resonating element 110 according to the comparison signal So of the comparator circuit 155 (step S23).

In an embodiment of step S23, the comparison signal So informs the signal processing unit 157 of the number of instances in which the signal voltage Vi is higher than the voltage threshold Vr, so as for the signal processing unit 157 to determine whether the metal object 20 is present within the sensing reach SR. For instance, the signal processing unit 157 has a counter, whereas the comparator circuit 155 has a voltage comparator CAP. The voltage comparator CAP has two input ends for receiving the signal voltage Vi and the voltage threshold Vr, respectively. When the signal voltage Vi is higher than the voltage threshold Vr, the comparator circuit 155 sends a high level signal (or logic signal 1), that is, generating a pulse. When the signal voltage Vi is not higher than the voltage threshold Vr, the comparator circuit 155 sends a low level signal (or logic signal 0), that is, not generating any pulse. The counter receives the high level signal (or logic signal 1) and low level signal (or logic signal 0) from the comparator circuit 155 and counts the number of instances of receiving a high level signal (or logic signal 1) during a predetermined time period, that is, counting the pulses of the comparison signal So. Furthermore, the counter compares the count with a quantity threshold. When the count is larger than the quantity threshold, the counter sends a determination result, showing that the metal object 20 falls beyond the sensing reach SR of the resonating element 110. When the count is not larger than the quantity threshold, the counter does not send any determination result, showing that the metal object 20 falls within the sensing reach SR of the resonating element 110. The quantity threshold is predetermined in accordance with the actual signal strength and stored in the signal processing unit 157. Therefore, the signal processing unit 157 at least comprises a processing element, the counter coupled to the processing element, and a storage element coupled to the processing element. The processing element is capable of timing and determining. The storage element stores an execution program and/or parameters (configuration values, such as a quantity threshold and a predetermined time period) required for the execution process.

In an embodiment, the voltage retrieving unit 151 is a voltage dividing circuit. The voltage retrieving unit 151 comprises resistors R11~R14 which are coupled to each other. The resistors R11~R14 adjustably change the retrieved end voltage Va to the voltage threshold Vr in accordance with a constant voltage difference and/or specific ratio. The present invention is not restrictive of the quantity of the resistors; hence, circuit designers may choose the quantity of the resistors as needed (for example, in accordance with the amplitude of the end voltage Va, and the range of the input of the voltage comparator CAP.) Take four resistors R11~R14 as an example, resistor R11 and resistor R12 are series-connected between node Na (the resonating element 110) and the comparator circuit 155 (such as a positive input end of the voltage comparator CAP). Resistor R13 and resistor R14 are series-connected between supply voltage VDD and the ground GND. Furthermore, a voltage dividing point of resistor R11 and resistor R12 and a voltage dividing point of resistor R13 and resistor R14 are coupled together. Therefore, one end of resistor R11 is coupled to node Na (the resonating element 110), whereas the other end of resistor R11 is coupled to node N51. One end of resistor R12 is coupled to node N51, whereas the other end of resistor R12 is coupled to the comparator circuit 155 (such as a positive input end of the voltage comparator CAP). One end of resistor R13 is coupled to supply voltage VDD, whereas the other end of resistor R13 is coupled to node N51. One end of resistor R14 is coupled to node N51, whereas the other end of resistor R14 is coupled to the ground GND.

In an embodiment, the voltage retrieving unit 151 is a voltage dividing circuit. The voltage retrieving unit 151 comprises resistors R31~R33 which are coupled to each other. The resistors R31~R33 adjustably change supply voltage VDD to the voltage threshold Vr in accordance with a constant voltage difference and/or specific ratio. The present invention is not restrictive of the quantity of the resistors; hence, circuit designers may choose the quantity of the resistors as needed (for example, in accordance with the amplitude of the end voltage Va, and the range of the input of the voltage comparator CAP.) Take three resistors R31~R33 as an example, resistor R31 and resistor R32 are series-connected between supply voltage VDD and the ground GND. Resistor R33 is coupled between a voltage dividing point of resistor R31 and resistor R32 and the comparator circuit 155 (for example, a negative input end of the voltage comparator CAP). Therefore, one end of resistor R31 is coupled to supply voltage VDD, whereas the other end of resistor R31 is coupled to node N53. One end of resistor R32 is coupled to node N53, whereas the other end of resistor R32 is coupled to the ground GND. One end of resistor R33 is coupled to node N53, whereas the other end of resistor R33 is coupled to the comparator circuit 155 (for example, a negative input end of the voltage comparator CAP).

Figure 5:
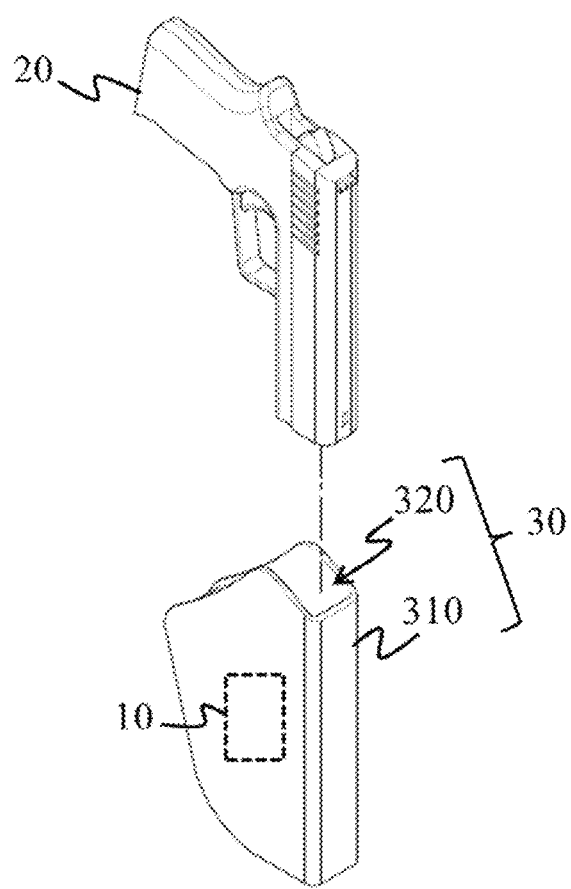
FIG. 5 is a schematic view of a sensing circuit of FIG. 1 according to an embodiment of the present invention.
Figure 6:
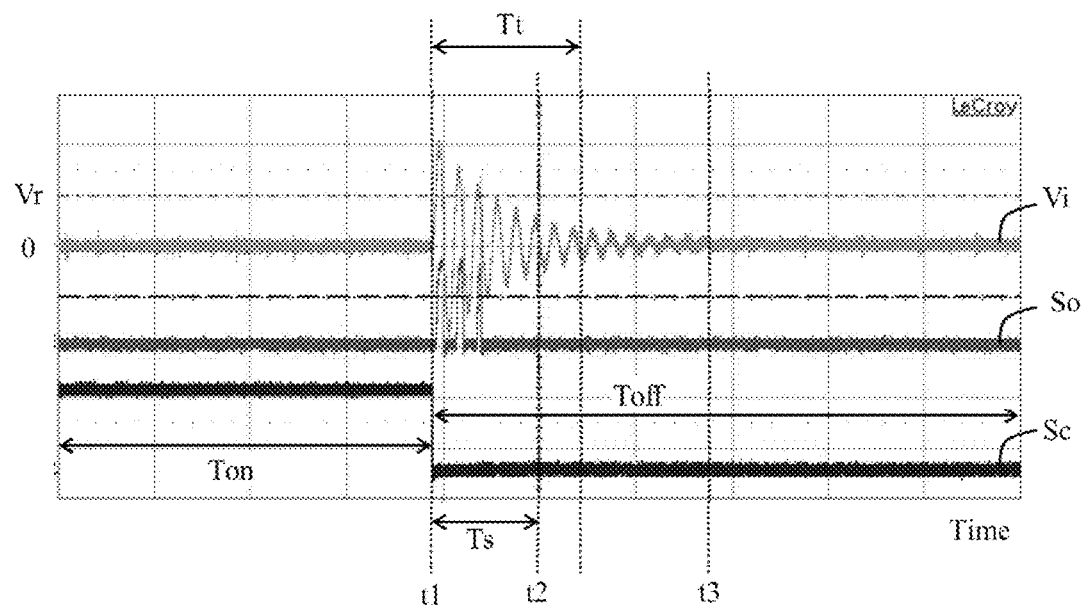
FIG. 6 is a timing diagram of related signals of the determining circuit of FIG. 3 according to an embodiment of the present invention.
Figure 7:
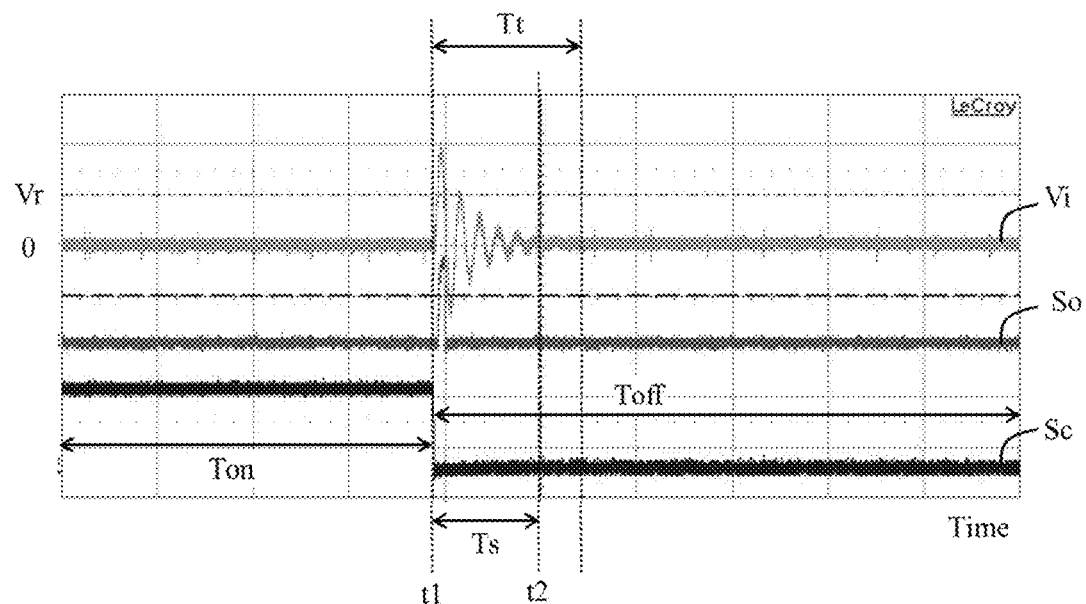
FIG. 7 is a timing diagram of related signals of the determining circuit of FIG. 3 according to another embodiment of the present invention.

FIG. 5 is a schematic view of the sensing circuit 10 of FIG. 1 according to an embodiment of the present invention. FIG. 6 is a timing diagram of related signals of the determining circuit 150 of FIG. 3 according to an embodiment of the present invention. FIG. 7 is a timing diagram of related signals of the determining circuit 150 of FIG. 3 according to another embodiment of the present invention.

Referring to FIG. 5, the metal object 20 is a pistol for exemplary purposes, and the pistol (the metal object 20) is received in a receiving space 320 enclosed by a bag 310 of a holster 30. The sensing circuit 10 is embedded in the bag 310 of the holster 30. The resonating element 110 is disposed in the bag 310 and positioned proximate to the receiving space 320. The quantity threshold is set to 2.

Referring to FIG. 6, when the pistol (the metal object 20) is not placed in the receiving space 320 (that is, when the metal object 20 falls beyond the sensing reach SR of the resonating element 110), the signal voltage Vi is higher than the voltage threshold Vr thrice during a predetermined time period Ts so that the comparator circuit 155 generates the comparison signal So with three pulses accordingly. Afterward, the signal processing unit 157 determines that the number of pulses (that is, the number of instances in which the signal voltage Vi is higher than the voltage threshold Vr) is 3 according to the comparison signal So and then compares the pulse number "3" with the quantity threshold "2", so as to determine that the metal object 20 falls beyond the sensing reach SR of the resonating element 110 (because the pulse number "3" is larger than the quantity threshold "2".)

When the pistol (the metal object 20) is placed in the receiving space 320 (that is, the metal object 20 falls within the sensing reach SR of the resonating element 110), the pistol (the metal object 20) causes great reduction in the value Q of the resonating element 110 because of iron losses (as the metal object 20 approaches thereto). As a result, the signal voltage Vi is higher than the voltage threshold Vr once during the predetermined time period Ts so that the comparator circuit 155 generates the comparison signal So with one pulse accordingly, as shown in FIG. 7. Afterward, the signal processing unit 157 determines that the number of pulses (that is, the number of instances in which the signal voltage Vi is higher than the voltage threshold Vr) is 1 according to the comparison signal So and then compares the pulse number "1" with the quantity threshold "2", so as to determine that the metal object 20 falls within the sensing reach SR of the resonating element 110 (because the pulse number "1" is not larger than the quantity threshold "2".)

The signal processing unit 157 resets the count (that is, the counter zeros out the count) before each determination cycle begins (that is, before the predetermined time period Ts begins, or after the predetermined time period Ts ends and the count is sent), with a view to preparing for the next determination process.

Figure 8:
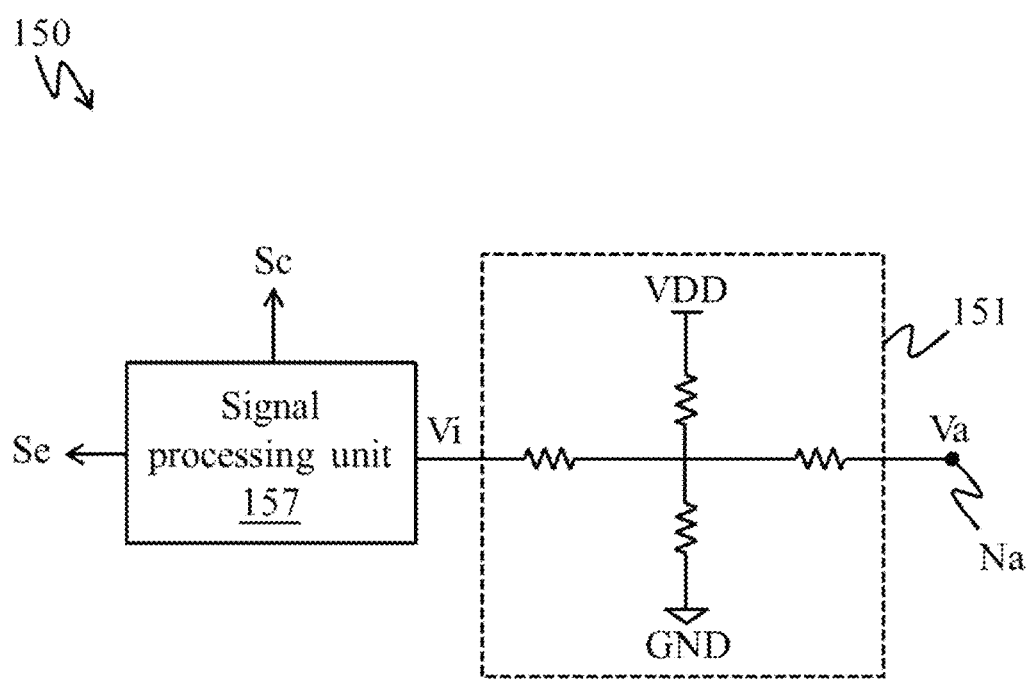
FIG. 8 is a schematic view of the determining circuit of FIG. 1 according to another embodiment of the present invention.

In another embodiment, the determining circuit 150 performs the comparison process without the comparator circuit 155. FIG. 8 is a schematic view of the determining circuit 150 of FIG. 1 according to another embodiment of the present invention. Referring to FIGS. 1 and 8, in another embodiment, the determining circuit 150 comprises the voltage retrieving unit 151 and the signal processing unit 157. The voltage retrieving unit 151 is coupled to the signal processing unit 157.

Referring to FIGS. 1, 3 and 8, the voltage retrieving unit 151 retrieves the end voltage Va of the resonating element 110 to generate the signal voltage Vi corresponding to the end voltage Va (step S21') and directly provides the signal voltage Vi to the signal processing unit 157 for use in the determination process. The signal processing unit 157 detects the duration of a valid signal of the signal voltage Vi (step S22') and determines the position of the metal object 20 relative to the resonating element 110 according to the detected duration (step S23').

For instance, the signal processing unit 157 at least comprises a processing element, a timer coupled to the processing element, and the storage element coupled to the processing element. The signal voltage Vi is a high-frequency sine wave signal. The processing element receives the signal voltage Vi and detects the amplitude of the signal voltage Vi. If the amplitude of the signal voltage Vi is larger than a valid value, the processing element enables the timer to start timing. If the amplitude of the signal voltage Vi is smaller than the valid value or is equal to zero for longer than a half of a cycle, the processing element enables the timer to stop timing and send the timing duration. The processing element receives the timing duration from the timer and compares it with a time threshold. When the timing duration is larger than the time threshold, the processing element determines that the metal object 20 falls beyond the sensing reach SR of the resonating element 110. Conversely, when the timing duration is not larger than the time threshold, the processing element determines that the metal object 20 falls within the sensing reach SR of the resonating element 110. The time threshold is predetermined and stored in the storage element.

In another embodiment, the signal processing unit 157 calculates the duration without the timer. The signal processing unit 157 at least comprises the processing element and the storage element coupled to the processing element. The processing element receives the signal voltage Vi and detects the amplitude of the signal voltage Vi. If the amplitude of the signal voltage Vi is larger than the valid value, the processing element records the point in time of commencement. If the amplitude of the signal voltage Vi is smaller than the valid value or is equal to zero for longer than a half of a cycle, the processing element records the point in time of termination and calculates the time difference between the point in time of commencement and the point in time of termination in order to obtain the duration. Afterward, the processing element determines whether the metal object 20 falls within the sensing reach SR of the resonating element 110 according to the obtained duration and the time threshold.

Take the signal voltage Vi shown in FIG. 6 and FIG. 7 as an example, the time threshold is set to Tt. When the pistol (the metal object 20) is not placed in the receiving space 320 (that is, when the metal object 20 falls beyond the sensing reach SR of the resonating element 110), the duration of a valid signal of the signal voltage Vi, as obtained by the signal processing unit 157, is the time difference t3–t1 between point in time t3 and point in time t1, as shown in FIG. 6. Hence, the signal processing unit 157 compares the duration t3–t1 with the time threshold Tt and thus determines that the metal object 20 falls beyond the sensing reach SR of the resonating element 110 (because the duration t3–t1 is larger than the time threshold Tt.)

When the pistol (the metal object 20) is placed in the receiving space 320 (that is, when the metal object 20 falls within the sensing reach SR of the resonating element 110), the duration of a valid signal of the signal voltage Vi, as obtained by the signal processing unit 157, is the time difference t2–t1 between point in time t2 and point in time t1, as shown in FIG. 7. Hence, the signal processing unit 157 compares the duration t2–t1 with the time threshold Tt and thus determines that the metal object 20 falls within the sensing reach SR of the resonating element 110 (because the duration t2–t1 is not larger than the time threshold Tt.)

In an embodiment, the processing element is a system on a chip (SoC), a central processing unit (CPU), or a micro control unit (MCU). The storage element is implemented by one or more memories.

In an embodiment, the power supply circuit 130 supplies power to the resonating element 110 intermittently, whereas the determining circuit 150 performs the step of determining whether the metal object 20 is present within the sensing reach SR (step S02) while the power supply circuit 130 is not supplying power to the resonating element 110.

Figure 9:
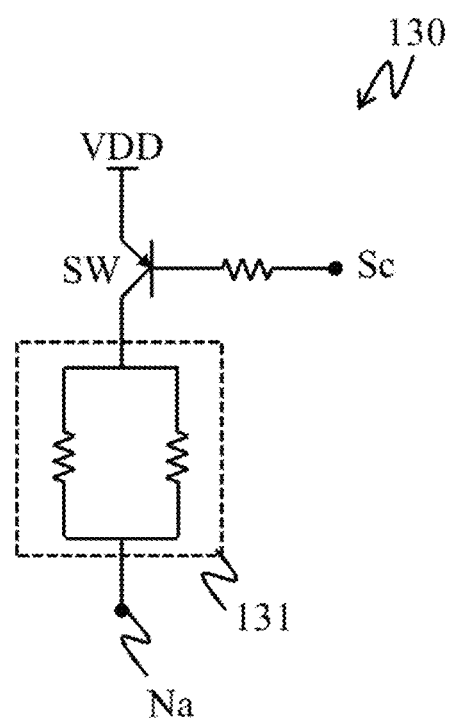
FIG. 9 is a schematic view of a power supply circuit of FIG. 1 according to an embodiment of the present invention.

FIG. 9 is a schematic view of the power supply circuit 130 of FIG. 1 according to an embodiment of the present invention. In an embodiment, the power supply circuit 130 comprises a power switch SW coupled between supply voltage VDD and node Na. The power switch SW is controlled by a control signal Sc. The control signal Sc enables the power switch SW intermittently so that the power switch SW electrically connects supply voltage VDD and node Na intermittently, thereby allowing power to be supplied to the resonating element 110. The power switch SW is a transistor.

In an embodiment, the power supply circuit 130 further comprises a voltage adjusting circuit 131. The voltage adjusting circuit 131 is coupled between the power switch SW and node Na. When the power switch SW is ON, the voltage adjusting circuit 131 receives supply voltage VDD through the power switch SW and adjustably changes supply voltage VDD to a driving voltage by a constant voltage difference. The voltage adjusting circuit 131 provides the driving voltage to the resonating element 110. In an embodiment, the voltage adjusting circuit 131 comprises at least one resistor.

For instance, after the control signal Sc has turned the power switch SW ON for an enable time Ton, the control signal Sc turns the power switch SW OFF for a disable time Toff. When the power switch SW is ON, the power supply circuit 130 supplies power to the resonating element 110. When the power switch SW is OFF, the power supply circuit 130 does not supply power to the resonating element 110, and the determining circuit 150 starts to perform a determination process (the predetermined time period Ts begins.) After the determining circuit 150 has finished performing the determination process (step S02), the control signal Sc controllably triggers the power switch SW to be ON for an enable time Ton and then Off for a disable time Toff, thereby allowing the determining circuit 150 to perform the determination process during disable time Toff. By analogy, the power switch SW alternates between the ON state and the OFF state periodically and repeatedly. The predetermined time period Ts is shorter than or equal to the driving cycle (i.e., the sum of an enable time Ton and a disable time Toff) of the resonating element 110. Preferably, the predetermined time period Ts is shorter than or equal to a disable time Toff.

In an embodiment, the control signal Sc is generated by the determining circuit 150 (the signal processing unit 157). Therefore, a control end of the power switch SW is coupled to the determining circuit 150 (the signal processing unit 157).

In an embodiment, if the determining circuit 150 (the signal processing unit 157) determines that the metal object 20 falls beyond the sensing reach SR of the resonating element 110, the determining circuit 150 (the signal processing unit 157) sends a notification signal Se for notifying and/or starting the external device.

Referring to FIG. 1, in an embodiment, the sensing circuit 10 further comprises a network module 170. The network module 170 is coupled to the determining circuit 150 (the signal processing unit 157) and wirelessly connected to an external device (not shown). When the signal processing unit 157 determines that the metal object 20 falls beyond the sensing reach SR of the resonating element 110, the signal processing unit 157 sends the notification signal Se to the external device through the network module 170. The external device is a multimedia retrieving device, such as a body worn camera, an in-car video, a sound recording device, an event data recorder, a surveillance camera, a mobile monitoring device and a smartphone, or is an event recording apparatus, such as a cloud server, a command center, and a workstation. When the external device is a multimedia retrieving device, the notification signal Se enables the multimedia retrieving device to retrieve environmental information, for example, carry out video recording or audio recording. When the external device is an event recording apparatus, the notification signal Se notifies the event recording apparatus of an event and records the time at which the event happens.

For instance, with the metal object 20 being a pistol for exemplary purposes, the sensing circuit 10 detects the time at which the pistol leaves a holster and thus enables a forensic device or reports to a command center accordingly.

In an embodiment, the network module 170 is a wireless transmission unit. The wireless transmission unit is a Bluetooth-enabled transmission unit, but the present invention is not limited thereto.

In conclusion, a sensing circuit for a metal object and a method of sensing a metal object are provided according to embodiments of the present invention, so as to detect for the point in time when the metal object leaves a target position and thereby trigger another device to act accordingly.

What is claimed is:

1. A sensing circuit for a metal object, comprising:
   a resonating element;
   a power supply circuit coupled to the resonating element to drive the resonating element to generate an oscillation; and
   a determining circuit coupled to the resonating element to determine a position of a metal object relative to the resonating element according to an energy change of the resonating element;
   wherein the determining circuit comprises:
   a voltage retrieving unit for retrieving an end voltage of the resonating element to generate a signal voltage corresponding to the end voltage;
   a comparator circuit coupled to the voltage retrieving unit to generate a comparison signal according to a voltage threshold and the signal voltage; and
   a signal processing unit coupled to the comparator circuit to determine a position of the metal object relative to the resonating element according to the comparison signal.

2. The sensing circuit for a metal object according to claim 1, further comprising a holster which the resonating element is disposed on, wherein the metal object is a pistol.

3. The sensing circuit for a metal object according to claim 1, wherein the resonating element is an LC circuit.

4. The sensing circuit for a metal object according to claim 1, wherein the signal processing unit determines that the metal object falls beyond a sensing reach of the resonating element when the end voltage during a predetermined time period is higher than the voltage threshold for a number of times larger than a quantity threshold, and the signal processing unit determines that the metal object falls within the sensing reach of the resonating element when the end voltage during the predetermined time period is higher than the voltage threshold for a number of times not larger than the quantity threshold.

5. The sensing circuit for a metal object according to claim 1, wherein the signal processing unit counts a number of pulses of the comparison signal during a predetermined time period, determines that the metal object falls beyond a sensing reach of the resonating element when the number of pulses is larger than a quantity threshold, and determines that the metal object falls within the sensing reach of the resonating element when the number of pulses is not larger than the quantity threshold.

6. The sensing circuit for a metal object according to claim 1, further comprising a network module through which the signal processing unit sends a notification signal to an external device when the signal processing unit determines that the metal object falls beyond the sensing reach of the resonating element.

7. The sensing circuit for a metal object according to claim 1, wherein the power supply circuit supplies power to the resonating element intermittently, and the determining circuit determines a position of the metal object relative to the resonating element while the power supply circuit is not supplying power to the resonating element.

8. A method of sensing a metal object, comprising the steps of:
   driving a resonating element to generate an oscillation; and
   determining a position of a metal object relative to the resonating element according to an energy change of the resonating element during a time period of generation of the oscillation;
   wherein the step of determining a position of a metal object relative to the resonating element according to an energy change of the resonating element comprises:
   retrieving an end voltage of the resonating element to generate a signal voltage corresponding to the end voltage;
   generating a comparison signal according to a voltage threshold and the signal voltage; and
   determining a position of the metal object relative to the resonating element according to the comparison signal.

9. The method of claim 8, wherein the resonating element is disposed on a holster, and the metal object is a pistol which matches the holster.

10. The method of claim 8, wherein the resonating element is an LC circuit.

11. The method of claim 8, wherein the step of determining a position of the metal object relative to the resonating element according to the comparison signal comprises:
   counting a number of pulses of the comparison signal during a predetermined time period;
   determining that the metal object falls beyond a sensing reach of the resonating element when the number of pulses is larger than a quantity threshold; and
   determining that the metal object falls within the sensing reach of the resonating element when the number of pulses is not larger than the quantity threshold.

12. The method of claim 8, wherein the step of generating a comparison signal according to a voltage threshold and the signal voltage comprises generating the pulses of the comparison signal when the signal voltage is higher than the voltage threshold.

13. The method of claim 8, further comprising sending a notification signal to an external device wirelessly upon determination that the metal object falls beyond the sensing reach of the resonating element.

14. The method of claim 8, wherein the step of driving a resonating element to generate an oscillation comprises supplying power to the resonating element intermittently, and the step of determining a position of a metal object relative to the resonating element according to an energy change of the resonating element is performed while power is not being supplied to the resonating element.

15. A sensing circuit for a metal object, comprising:
   a resonating element;
   a power supply circuit coupled to the resonating element to drive the resonating element to generate an oscillation; and
   a determining circuit coupled to the resonating element to determine a position of a metal object relative to the resonating element according to an energy change of the resonating element;
   wherein the determining circuit comprises:
   a voltage retrieving unit for retrieving an end voltage of the resonating element to generate a signal voltage corresponding to the end voltage; and
   a signal processing unit coupled to the voltage retrieving unit to determine a position of the metal object relative to the resonating element according to a duration of a valid signal of the signal voltage.

16. The sensing circuit for a metal object according to claim 15, wherein the signal processing unit determines that the metal object falls beyond a sensing reach of the resonating element when the duration is larger than a time threshold, and determines that the metal object falls within the sensing reach of the resonating element when the duration is not larger than the time threshold.

* * * * *